United States Patent Office 3,523,133
Patented Aug. 4, 1970

3,523,133
PREPARATION OF FLUORINATED ESTERS
Everett Mailey, Norristown, and Luke Ralph Ocone, Wyndmoor, Pa., assignors to Pennwalt Corporation, Philadelphia, Pa., a corporation of Pennsylvania
No Drawing. Filed Nov. 22, 1967, Ser. No. 684,930
Int. Cl. C07c 67/00, 69/14
U.S. Cl. 260—491                3 Claims

ABSTRACT OF THE DISCLOSURE

Fluorinated esters having the formula $$CF_3CFHCF_2\underset{H}{\overset{CH_3}{C}}-O-\overset{O}{\overset{\|}{C}}-R$$

where R is an alkyl radical having on to eight carbon atoms, are prepared by reacting hexafluoropropylene with an ethyl ester of a carboxylic acid of the formula $$R\overset{O}{\overset{\|}{C}}OC_2H_5$$

The fluorinated esters can be saponified to yield 3,3,4,5,5,5-hexafluoro-2-pentanol, a known compound which is an intermediate in the preparation of oil and water-resistant polymers.

---

This invention relates to fluorine-containing esters and the method of making same. More particularly, this invention concerns a process which comprises reacting hexafluoropropene with an ethyl ester of a saturated aliphatic carboxylic acid having one to nine carbon atoms, and to the fluorinated ester which is the addition product of said reaction.

In accordance with the present invention, an ethyl ester of a carboxylic acid represented by the formula $$R\overset{O}{\overset{\|}{C}}OC_2H_5$$

where R is an alkyl radical having one to eight carbon atoms, preferably one to three carbon atoms, is reacted in the presence of a free-radical catalyst with hexafluoropropylene (perfluoropropene) to yield the novel ester represented by the formula $$CF_3CFHCF_2\underset{H}{\overset{CH_3}{C}}-O-\overset{O}{\overset{\|}{C}}-R$$

where R is as defined previously. The reaction may be depicted by the following generalized equation $$R\overset{O}{\overset{\|}{C}}OC_2H_5 + CF_2=CFCF_3 \longrightarrow CF_3CFHCF_2\underset{H}{\overset{CH_3}{C}}-O-\overset{O}{\overset{\|}{C}}-R$$

The novel compounds of this invention are thus formed by a unique and unexpected addition mechanism involving the alpha carbon atom of the ethyl ester reactant and the double bond of the perfluoropropene. The reaction is all the more unexpected because the mechanism does not occur to any significant extent when the homologue tetrafluoroethylene is reacted with the ethyl ester in an analogous manner. In contrast, the yields of the ester product obtained in the practice of the process embodied herein can be surprisingly high, e.g., of the order of about 80% and higher based on the hexafluoropropene consumed.

The molar ratio of ethyl ester to hexafluoropropylene employed in the reaction of this invention is not critical and can range from about 0.1:1 to about 20:1, preferably from 3.1 to 5:1. Reaction temperature can vary from about 80° C. to about 175° C. with from about 120 to 130° C. being preferred. The pressure employed is not critical, autogenous pressures being preferred. The highest yields are obtained in anhydrous systems. At the aforesaid reaction temperatures of about 80° C.–175° C., catalysts forming free-radicals at reasonable rates (e.g., half-life up to about 15 hours) are suitable to catalyze the reaction, such as benzoyl peroxide, acetyl peroxide, tertiary-butyl peroxyisobutyrate, para-chlorobenzyl peroxide, ditertiary butyl peroxide, cyclohexanone peroxide, dicumyl peroxide, methyl ethyl ketone peroxide, hydroxyheptyl peroxide, and the like. The preferred catalyst is ditertiary-butyl peroxide. Generally, from about 3 to 13% by weight of the free radical forming catalyst, based on the weight of the hexafluoropropylene, is sufficient. The reaction is ordinarily carried out for from about 10 to 30 hours to ensure reasonably good yield. The fluorinated ester product is recovered by conventional fractional distillation techniques conveniently carried out at atmospheric pressures.

The fluorinated esters of this invention, $$CF_3CFHCF_2\underset{H}{\overset{CH_3}{C}}-O-\overset{O}{\overset{\|}{C}}-R$$

where R is alkyl, are good solvents for the well known high-molecular-weight fluorinated polymers such as the polymers of vinylidene fluoride, vinyl fluoride, trifluoroethylene, and the copolymers of such materials. However, a prime use for the fluorinated esters is as the starting material for preparing the very useful alcohol, 3,3,4,5,5,5-hexafluoro-2-pentanol, a known compound disclosed in U.S. Pat. 3,202,643, Aug. 24, 1965, E. E. Frisch et al. The alcohol is prepared via a simple saponification of the ester using aqueous caustic according to known hydrolysis procedures and the reaction depicted as:

$$CF_3CFHCF_2\underset{H}{\overset{CH_3}{C}}-O\overset{O}{\overset{\|}{C}}R + NaOH \longrightarrow$$

$$CF_3CFHCF_2\underset{}{\overset{OH}{C}}HCH_3 + Na\overset{O}{\overset{\|}{O}}CR(soap)$$

This fluorinated alcohol is readily converted to the acrylate or methacrylate ester via reaction with acryloyl chloride or methacryloyl chloride. The resulting fluorinated acrylate ester is a useful monomer for preparing oleophobic and hydrophobic polymeric materials using conventional modes of polymerization, which materials are useful as textile treating agents.

The following is a specific embodiment of the invention that serves to exemplify the method and illustrate the use of the compounds within its scope.

To a stainless steel pressure vessel were charged 36.5 parts by weight (0.415 mole) of ethyl acetate, 15 parts (0.1 mole) of hexafluoropropylene, and 1 part ditertiary butyl peroxide. The reaction mixture was held at 125° C. for 18.5 hours with agitation. Distillation of the mixture yielded 20.6 parts (equivalent to an 86.5% conversion based on prefluoropropene charged) of 1-methyl-2,2,3,4,4,4-hexafluorobutyl acetate having structure $$CF_3CFHCF_2\underset{H}{\overset{CH_3}{C}}-O-\overset{O}{\overset{\|}{C}}-CH_3$$

which structure was confirmed by molecular weight determination from mass spectral data (238 vs. theoretical m.w. of 238), nuclear magnetic resonance measurements and infra-red spectroscopy. The product (about 95% pure) had a boiling point of 136–138° C., refractive index 1.3355 at 25.3° C., and density 1.43 at 25° C. Elemental analysis gave C, 35.68%; H, 3.60%; F, 49.30%. Calculated values of $C_7H_8F_6O_2$: C, 35.32%; H, 3.38%; F, 47.83%. This fluorinated ester was found to be an excellent solvent for polyvinylidene fluoride, polyvinyl fluoride, and similar polymers.

The foregoing experiment was substantially repeated except that tetrafluoroethylene was substituted for the perfluoropropene reactant. The reaction mixture yielded 4.3 parts of a white solid, which appeared to be a polymeric fluoroethylene and ethyl acetate adduct, and 5.2 parts of a complex liquid fraction having no major component. The ester addition product, which is analogous to the principal product of the reaction involving hexafluoropropylene, could not be isolated from the product mixture of this reaction.

To 15 parts of the previously prepared 1-methyl-2,2,3,4,4,4-hexafluorobutyl acetate was added 100 parts of 10% aqueous NaOH. The mixture was stirred for 18 hours at ambient temperatures. It separated into two phases, and the lower organic phase was twice treated with methylene chloride. The extracts were combined, dried with $MgSO_4$ crystals and distilled to yield 4.3 parts (35% conversion based on the feed ester) of 3,3,4,5,5,5-hexafluoro-2-pentanol, a colorless liquid, B.P. 116° C., refractive index 1.3240 at 25° C. The structure was confirmed by infrared and nuclear magnetic resonance spectra. The alcohol so prepared was reacted with a stoichiometric amount of methacryloyl chloride at 25° C. to yield the methacrylate ester

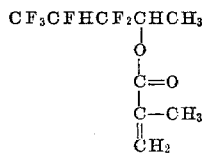

Cotton fabric was coated with a solution of 1.4 parts of this ester in 11 parts of acetone. The fabric was then exposed to ultraviolet radiation at ambient temperatures which caused the methacrylate ester to polymerize. The resulting polymer coating provided the subsequently dried fabric with water and oil-resistant properties.

We claim:
1. A method of preparing a fluorinated ester represented by the formula

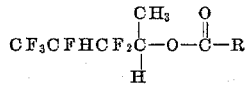

where R is an alkyl radical having one to eight carbon atoms which comprises reacting hexafluoropropylene with an ethyl ester of a carboxylic acid represented by the formula

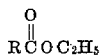

where R is as defined above, in the presence of a free radical forming catalyst at a temperature within the range of about 80° C. to about 175° C.

2. The method according to claim 1 wherein the reaction temperature is about 120° C. to about 130° C.

3. The method according to claim 1 wherein the ethyl ester of the carboxylic acid is ethyl acetate.

References Cited

UNITED STATES PATENTS

| | | | |
|---|---|---|---|
| 2,559,628 | 7/1951 | Joyce | 260—488 |
| 3,030,409 | 4/1962 | Andreades et al. | 260—488 |
| 3,413,332 | 11/1968 | Schmerling | 260—491 |

OTHER REFERENCES

Chemical Abstracts, 61:13445d (1964).

LORRAINE A. WEINBERGER, Primary Examiner

V. GARNER, Assistant Examiner

U.S. Cl. X.R.

117—17, 135.5, 143, 161; 260—408, 486, 488, 633